(12) United States Patent
Hartzsch (10) Patent No.: US 11,108,348 B2
(45) Date of Patent: Aug. 31, 2021

(54) ADAPTIVE HOLD CURRENT FOR ELECTRIC MOTORS

(71) Applicant: Elmos Semiconductor SE, Dortmund (DE)

(72) Inventor: Jörg Hartzsch, Dortmund (DE)

(73) Assignee: ELMOS SEMICONDUCTOR SE, Dortmund (DE)

( * ) Notice: Subject to any disclaimer, the term of this patent is extended or adjusted under 35 U.S.C. 154(b) by 203 days.

(21) Appl. No.: 16/524,220

(22) Filed: Jul. 29, 2019

(65) Prior Publication Data

US 2020/0044587 A1 Feb. 6, 2020

(30) Foreign Application Priority Data

Aug. 2, 2018 (DE) ...................... 10 2018 118 783.1

(51) Int. Cl.
| | |
|---|---|
| *H02P 6/21* | (2016.01) |
| *B60L 7/26* | (2006.01) |
| *B60L 50/16* | (2019.01) |
| *H02P 6/185* | (2016.01) |
| *H02P 6/15* | (2016.01) |
| *H02P 3/08* | (2006.01) |
| *H02P 6/28* | (2016.01) |

(52) U.S. Cl.
CPC ................ *H02P 6/185* (2013.01); *H02P 3/08* (2013.01); *H02P 6/153* (2016.02); *H02P 6/28* (2016.02); *H02P 2203/01* (2013.01)

(58) Field of Classification Search
CPC ............................... H02P 25/024; H02P 23/10
See application file for complete search history.

(56) References Cited

U.S. PATENT DOCUMENTS

| | | | |
|---|---|---|---|
| 4,272,713 A | 6/1981 | Pritchard | |
| 2007/0252587 A1 | 11/2007 | Stauder et al. | |
| 2013/0193889 A1 | 8/2013 | Huwiler et al. | |

FOREIGN PATENT DOCUMENTS

| | | |
|---|---|---|
| DE | 10 2009 030 884 A1 | 1/2011 |
| WO | 8802952 A1 | 4/1988 |
| WO | 2009071267 A2 | 6/2009 |

*Primary Examiner* — Kawing Chan
*Assistant Examiner* — Charles S Laughlin
(74) *Attorney, Agent, or Firm* — Mindful IP PLLC (57) ABSTRACT

In a method for generating a blocking moment in a standstill state of an electrically commutated electric motor having at least two windings, on which electric motor a possibly varying load moment acts from outside in the standstill state, first, a blocking current is supplied at a maximum value into a first winding. This blocking current is successively reduced to, possibly, a minimum value. From that moment the inductivity of the electric motor is controlled, namely by controlling the blocking current if the control deviation between the actual value and the set value of the inductivity exceeds a predetermined threshold value. Thereby, it is possible to control the blocking current in an adaptive manner insofar as, despite a varying load moment, the standstill state of the electric motor can be maintained by varying the blocking current.

12 Claims, 4 Drawing Sheets

ADAPTIVE HOLD CURRENT FOR ELECTRIC MOTORS

The present patent application claims the priority of German Patent Application 10 2018 118 783.1 of Feb. 8, 2018, the disclosure of which is incorporated herein by reference.

The disclosure relates to a method and a device for generating a blocking moment in a standstill state of an electrically commutated electric motor having at least two windings, on which electric motor a possibly varying load moment acts from outside in the standstill state, which load moment does not exceed a predetermined maximum value. The disclosure particularly relates to the generation of a blocking moment in the standstill state of a sensor-less electric motor and in particular of a sensor-less stepper motor.

Besides a torque in a normal or positioning operation, customer requirements made on electric actuators often also specify a blocking moment up to which the actuator must stand still in the standstill state while load moments act from outside. With electrically commutated electric motors with sensors for the electric commutation, such as e.g. potentiometers, Hall sensors, or with more cost-intensive BLDC motor systems using special methods such as e.g. "Virtu-Hall", approaches exist for the requirement of standing still up to a predetermined blocking moment. All solutions currently on the market have in common that they are rather complex and thus, for commercial reasons, are less suited for smaller actuators which are available at reasonable cost.

In electrically commutated electric motors, whose commutation is performed without sensors, i.e. in a sensor-less manner, the requirement made with regard to the blocking moment is usually met by a constant supply of blocking current in the standstill state of the actuator, whereby electric energy is constantly required, even though no or only a small blocking moment would be required mechanically to maintain the standstill state.

A method for reducing the blocking current for maintaining a rotor position in an electrically commutated electric motor is known from US 2013/0193889 A3. This method uses Hall sensors to detect a change in the rotor position to be maintained. Moreover, a plurality of iteration steps is performed in which the reduced blocking current oscillates about its target value required to maintain the rotor position, which, as a disadvantage, causes noise and electromagnetic emissions.

It is known from DE 10 2008 030 884 A1 and US 2007/0252587 to detect the rotor position in an electrically commutated electric motor based on the value of the motor inductivity and its change.

Various control circuits for electrically commutated electric motors are described in WO 88/02952 A1, WO 2009/071267 A1 and U.S. Pat. No. 4,272,714 A.

It is an object of the disclosure to improve the supply of blocking current to electric motors electrically commutated in a sensor-less manner.

To achieve this object, the disclosure provides a method for generating a blocking moment in a standstill state of an electrically commutated electric motor having at least two windings, on which electric motor a possibly varying load moment acts from outside in the standstill state, which load moment does not exceed a predetermined maximum value, wherein, in the method, a) a blocking current with a maximum value is supplied into a terminal of a first winding, which compensates the predetermined maximum load moment acting on the electric motor from outside, b) a motor inductivity parameter is determined which represents an inductivity of the electric motor when the maximum blocking current is supplied thereto in a standstill state, and the value of this maximum inductivity parameter forms an initial value, c) it is attempted, by successively reducing the blocking current, to achieve a deviation of the value of the motor inductivity parameter from the initial value by more than a predetermined control deviation, d) in case such a deviation of the motor inductivity parameter does not occur, the reduction of the blocking current is stopped upon reaching a predetermined minimum value for the blocking current, whereupon the value of the motor inductivity parameter is controlled to a value that does not deviate from the initial control value of the motor inductivity parameter given at the start of the control by more than the control deviation, e) in case that in step c) a deviation of the value of the motor inductivity parameter by more than the predetermined control deviation occurs, the value of the motor inductivity parameter is controlled to a value that does not deviate from the initial control value of the motor inductivity parameter given at the start of the control by more than the control deviation, f) a change of the motor inductivity parameter by a value greater than the control deviation, caused by a change of the load moment, is compensated by the control, the blocking current, however, being selected such that it is not smaller than the predetermined minimum value and such that it is not greater than the predetermined maximum value.

Analogously, the disclosure thus provides to adaptively control the blocking current required for maintaining the standstill state of an electrically commutated electric motor having at least two windings, this method being suited for use with sensor-less electrically commutated electric motors. At the beginning of the standstill state of the electric motor the maximum blocking current is supplied into a terminal of a first winding of the electric motor. This blocking current is rated such that it compensates the maximum load moments occurring due to a respective application, so that the electric motor remains stationary in the standstill state. Thereafter, a successive reduction of the blocking current is started. During this phase, the magnitude or value of a parameter is determined that represents the inductivity of the electric motor. This is because the inductivity of the electric motor changes at the moment the load moment applied to the electric motor causes a change in the position of the rotor of the electric motor. By the reduction of the blocking current this state is intended to be brought about consciously. The reduction of the blocking current ends when the blocking current reaches a predetermined minimum value. If the position of the rotor of the electric motor has not changed until then, this indicates that the load moment applied is comparatively small or non-existent.

Upon reaching the minimum value for the blocking current, a switch to a control of the motor inductivity parameter is made. From that moment, the blocking current is controlled, if the motor inductivity parameter changes by more than a predetermined value of the control deviation which may be equal to zero or different from zero. Thereby, it is possible to adapt and adjust the value of the motor current to the level of blocking current supply required for maintaining the electric motor in the standstill state in dependence on a varying load moment.

According to the disclosure the transition from the successive reduction of the blocking current to the blocking current control is effected without any iteration steps, i.e. without interposition of an on-off circuit with which the actual value for the blocking current would oscillate about the target or set value of the same. Rather, from the beginning of the control according to the disclosure, the control is a continuous control.

Various examples exist for the value that can be detected or determined in the standstill state of the electric motor in order to form the parameter representing motor inductivity. It has proven feasible to determine the motor inductivity parameter using the recirculation period that occurs if, during the supply of blocking current, a test current is supplied into a winding different from the one into which the blocking current is supplied. The supply of test current is suitably effected in the form of test pulses.

The detection of the value of the motor inductivity may generally be performed using a sensor, e.g. a sensor operating inductively. However, it is much more advantageous to operate in a sensor-less manner in this regard, which will be described hereinafter with reference to different examples.

In a further suitable example of the disclosure it is provided that the electric motor is controlled by means of a driver circuit having driver output stages associated to the winding terminals of the electric motor, that the drop of the test current supplied as a pulse is detected by means of a discharge current detector associated to that winding of the electric motor into which the test current is supplied as a pulse, and that the recirculation period is determined based on the output signal of the discharge current detector, i.e. based on the time of occurrence of the output signal in relation to the moment of the generation of test pulse.

In the example described above, the discharge current detector advantageously generates a signal when the value of the test current or the test pulse has dropped to below the minimum value.

In a further suitable example of the disclosure it may be provided that, given the electric motor is configured as a unipolar stepper motor, a clamping circuit is implemented per driver output stage in addition to the driver output stages common in unipolar stepper motors, which clamping circuit restricts the voltage at the winding terminal, into which the test current has been supplied as a pulse, to a preset value during the recirculation period, and that the discharge current detector signals the end of the voltage restriction, the recirculation period being determined based thereon (i.e. on the time).

Finally, it may be provided in a further example of the disclosure that the electric motor is controlled using a current chopper circuit including current chopper comparators, that the supply of the blocking current is effected by current chopper controlling the terminal of the first winding, that with the start of a clock interval of the current chopper control a current is supplied into the terminal of the first winding, which current increases up to a preset value and thereafter drops until the end of the clock interval, and that the chopper period from the start of the clock interval to the time within the clock interval at which the current reaches the preset value, is used as the motor inductivity parameter.

According to the disclosure a device also serves to achieve the above-mentioned object of the disclosure, which device is a device for generating a blocking moment in the standstill state of an electrically commutated electric motor having at least two windings, on which electric motor a possibly varying load moment acts from outside in the standstill state, which load moment does not exceed a predetermined maximum value, comprising a blocking current generation unit for supplying a blocking current into a terminal of a first winding of the electric motor, a motor inductivity detection unit for the detection of a motor inductivity parameter representing the value of the motor inductivity during standstill of the electric motor, a controller for controlling the blocking current during the standstill of the electric motor for compensation of a possibly varying load moment acting on the electric motor from outside, the controller being supplied, as a control deviation, with the difference between a set value for the motor inductivity parameter as a reference variable and an actual value of the motor inductivity parameter as a feedback variable, the actual value of the motor inductivity parameter being the value that occurs due to the value of the blocking current supplied during standstill and the value of the load moment acting on the electric motor, and the controller outputting a signal to the blocking current generation unit as a control variable, and a control unit for
controlling, during the standstill of the electric motor, the blocking current generation unit to supply a maximum blocking current to compensate for the maximum load moment potentially acting from outside on the electric motor during the standstill of the electric motor, controlling the motor inductivity detection unit for the purpose of detecting the motor inductivity parameter when the electric motor is supplied with the maximum blocking current, switching between a first operation mode in which the blocking current generation unit is controlled by the control unit, and a second operating mode in which the blocking current generation unit is controlled by the controller, controlling the blocking current generation unit to supply a blocking current which decreases successively starting from the maximum blocking current so as to cause a control deviation at the input of the controller which is greater than a predeterminable threshold value, this control of the blocking current generation unit ending at the latest when the blocking current has been reduced to a predeterminable minimum current, and activating the function of the controller for switching the control of the blocking current generation unit from the control unit to the controller if, during the successive reduction of the blocking current, the control deviation exceeds the threshold value, and to do so for the purpose of controlling the motor inductivity to the value of the control output value of the motor inductivity parameter given upon activation of the function of the controller.

Suitably, a test current generation unit is used with the device of the disclosure to generate test pulses adapted to be supplied into a winding other than the first winding during the standstill of the electric motor, the motor inductivity detection unit detects, as the motor inductivity parameter, the recirculation period resulting from the supply of a test pulse.

In the above-mentioned variant of the disclosure a driver circuit may be provided in addition, having driver output stages associated to the winding terminals of the electric motor and a discharge current detector associated to a terminal of the winding of the electric motor into which the test pulses can be supplied, a recirculation period being determinable based on the output signal of the discharge current detector.

In this regard it may be feasible that the discharge current detector generates an output signal when the value of the test current has dropped to below the minimum value.

When the electric motor is configured as a unipolar stepper motor, one clamping circuit is feasibly provided per driver output stage to restrict the voltage to a preset value at that winding of the electric motor into which the test pulses can be supplied, the discharge current detector outputting an output signal upon a decrease to below the preset value.

In a further suitable example of the device of the disclosure it may be provided that the blocking current generation unit has a current chopper circuit for the current chopper control of the terminal of the first winding, that, with the beginning of a clock interval of the current chopper control, a current can be supplied into the terminal of the first winding, which current increases up to a preset value and thereafter drops until the end of the clock interval, and that the chopper period from the start of the clock interval to the time within the clock interval at which the current reaches the preset value, is the motor inductivity parameter representing the motor inductivity.

In a sensor-less electrically commutated electric motor configured e.g. as a bipolar stepper motor, one of the two windings is used to supply an adjustable blocking current in the standstill state. Depending on the control concept, this may be effected using current sources, chopper current generators or by PWM generation. At special times, e.g. test currents are modulated upon the second winding, suitably cyclically modulated test pulses, whose energy input is as low as possible and whose modulation is selected such that as little mechanical and acoustic interferences as possible or no interferences at all are caused. An evaluation electronics detects the decay behavior of these test pulses and thus their recirculation periods.

This evaluation electronics, together with a device for generating the test pulses in combination with the usual driver circuits, may be considered as an example of the device according to the disclosure for the implementation of the method of the disclosure.

Experiments have shown that the measured values obtained are almost independent of the magnitude of the blocking current, but that the measured values depend on the load moment acting on the motor. Such a load moment leads to a slight change in the mechanical position of the rotor, which is sometimes also referred to as "drag loss" or "phase angle".

The above-described slight change in the mechanical position of the rotor has an influence on the motor inductivity and thus on the measuring results of the evaluation electronics that detect the decay behavior and thus the recirculation periods of the test pulses.

A typical approach to an implementation of the disclosure is, for example, to first stop the electric motor after an application-specific operation and, as is common, to apply the maximum blocking current thereto which guarantees the specific blocking moment under the specific mechanic maximum load states. According to the disclosure, from this time on at the latest, for example, the above-mentioned test pulses are supplied into a winding other than the winding into which the blocking current is supplied.

Thereafter, the blocking current is reduced successively and the evaluation is continued in a continuous manner, as described above. If a mechanic load moment is present at the motor, the measured values will start to drift, as described above, when the blocking current is reduced. Should this be the case, a further reduction of the blocking current will be omitted according to the disclosure, as soon as the extent of the drift exceeds a predetermined threshold value.

In an example, a control system is thus implemented on this basis, which controls the blocking current such that no loss in rotor position occurs, and which reduces the blocking current when the mechanical load moment decreases, while it increases the blocking current when the mechanical load moment increases.

With unipolar stepper motors, the above-described methods can be implemented in a physically analogous manner.

Depending on the type of electric motor electrically commutated in a sensor-less manner, the disclosure can be implemented in a correspondingly adapted form, wherein it can be ensured that the measuring signals for the determination of the motor inductivity are guaranteed to be independent from the level of the supply of blocking current, as described above.

By means of the disclosure, it is possible even with low-cost actuators using electric motors electrically commutated in a sensor-less manner, to implement the supply of blocking current in an adaptive manner, such as was possible up to now only with sensor-equipped systems or systems including complex BLDC systems using high and thus complex computing power.

The disclosure will be described in more detail hereinafter with reference to a plurality of examples as well as with reference to the drawings. Specifically, the Figures show.

Figure 1:
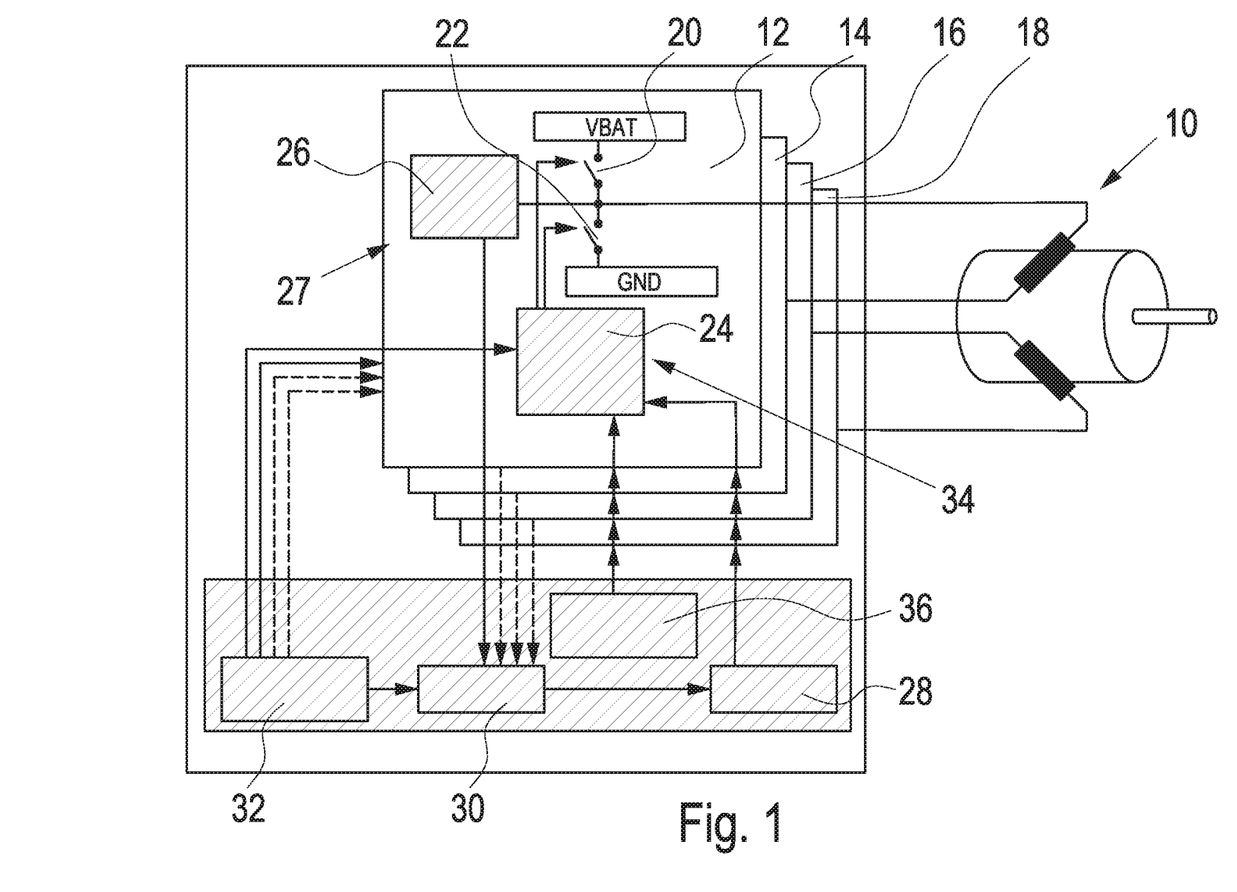
FIG. 1 an example of the circuitry of a bipolar stepper motor with adaptive supply of blocking current, FIG. 2 an exemplary behavior of a bipolar motor with adaptive supply of blocking current, FIG. 3 an example of a unipolar stepper motor with adaptive supply of blocking current, and FIG. 4 an example of a three-phase electric motor with adaptive supply of blocking current.

As illustrated in FIG. 1, the control of a bipolar stepper motor 10 can be expanded for an adaptive supply of blocking current. One of the two windings A and B is used to supply an adjustable blocking current, the blocking current being generated by means of at least one of the methods described hereinafter:

adjustable current sources,
adjustable current sinks,
PWM modulation with adjustable duty cycle or
chopper current control with adjustable current thresholds.

The test current is modulated onto the second winding, the energy input of the test current being as low as possible and the modulation thereof being selected such that as little mechanical and acoustic interferences as possible are incurred.

The usual control for the bipolar stepper motor comprises the output stages 12, 14, 16 and 18, which, as illustrated in FIG. 1, are connected with the winding terminals A0, A1, B1, B0. The structure of an output stage is shown in FIG. 1 with the output stage 12 as an example. The output stage 12 comprises a high-side driver 20 and a low-side driver 2, which are connected to VS 1 (e.g. VBAT) or VS 2 (e.g. GND). The two drivers are controlled by means of a control unit 24. A recirculation detector 26, e.g. configured as a discharge current detector 27, is also provided.

A controller 28 exists for the supply of blocking current, which controller generates an output signal for each driver output stage, which is supplied to the control unit 24 of the respective driver stage. The recirculation detectors 26 transmit signals which are counted per driver stage in a counter 30. The output signals of the recirculation detectors 26 are generated as a result of the supply of test pulses generated by a test current generation unit 32 in the form of a test pulse generator.

In the example illustrated in FIG. 1, the test current generation unit 32 generates test pulses which are either supplied to the terminal A0 or the terminal A1 of the winding A. The recirculation detector 26 of that output stage 12, 14 that is associated to the terminal A0 or the terminal A1 of the winding A, then supplies signals which are supplied to the counter 30. Thereby, the recirculation periods are detected metrologically. Depending on the length of the recirculation period, the controller 28 controls the blocking current or the controller 28 controls a blocking current generation device 34 which basically is the control unit for controlling the drivers 20, 21 of the output stages which are connected to the terminals B0 and B1 of the winding B.

A control unit 38 can in turn control the blocking current generation devices 34 at the start of the adaptive blocking current control, namely for the purpose of reducing the blocking current. This reduction of the blocking current continues until either a minimum value for the blocking current is achieved or until a change in the recirculation periods is detected which exceeds a predeterminable minimum. In either case, a switching to the controller 29 is performed so that, from that moment, the control of the recirculation period is effected through the blocking current.

In FIG. 1 some of the signal paths are drawn in broken lines. These signal paths are only necessary if the disclosure is also used with an inverse association of windings with respect to the test pulses and the blocking current, or if the method is also applied to the respective second terminal of the winding. If the method is applied to all windings, the finest resolution for the control of the maintenance of the blocking position is achieved.

Figure 2:
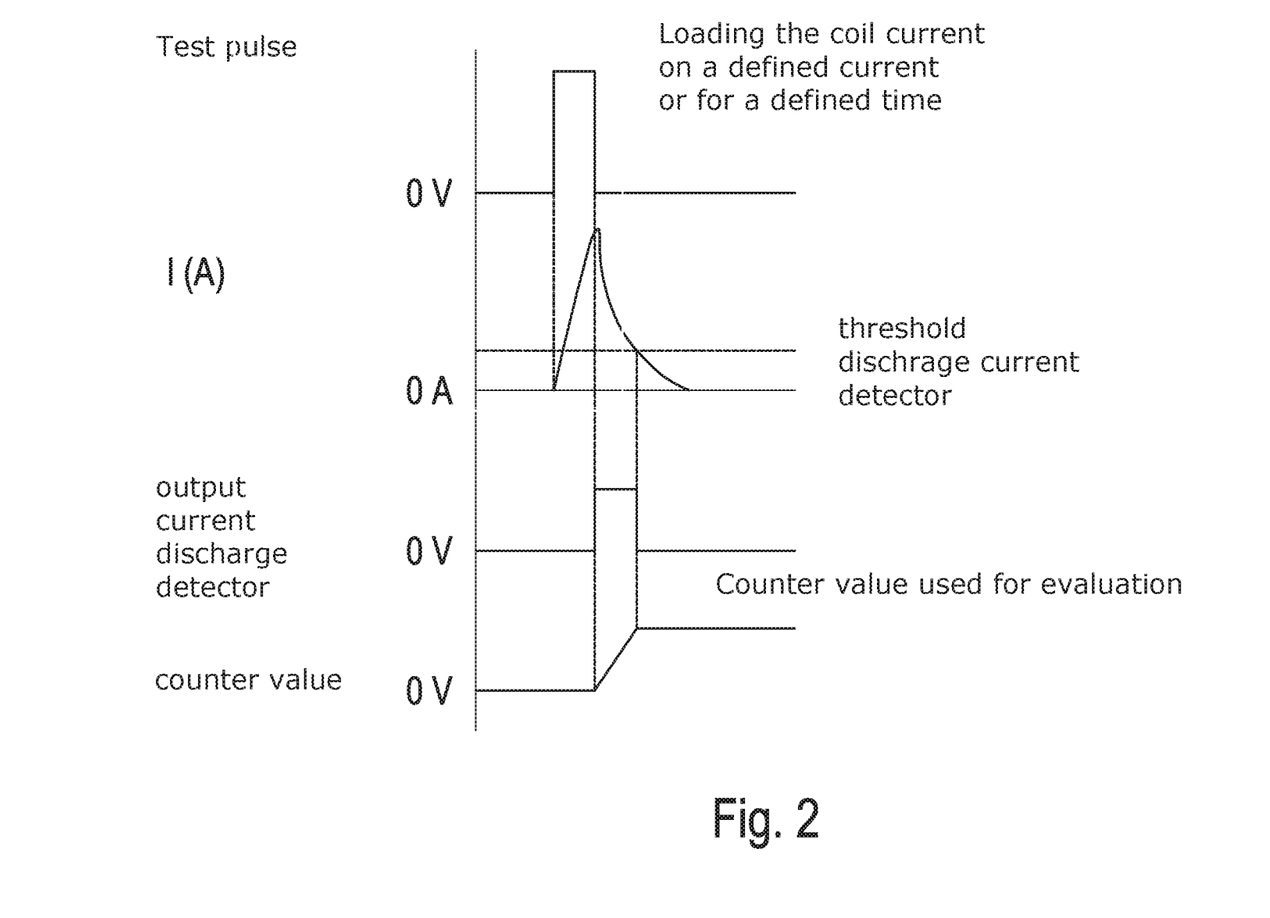

FIG. 2 illustrates that the measuring values obtained are almost independent from the magnitude of the blocking current, but dependent on the load moment acting on the motor.

Figure 3:
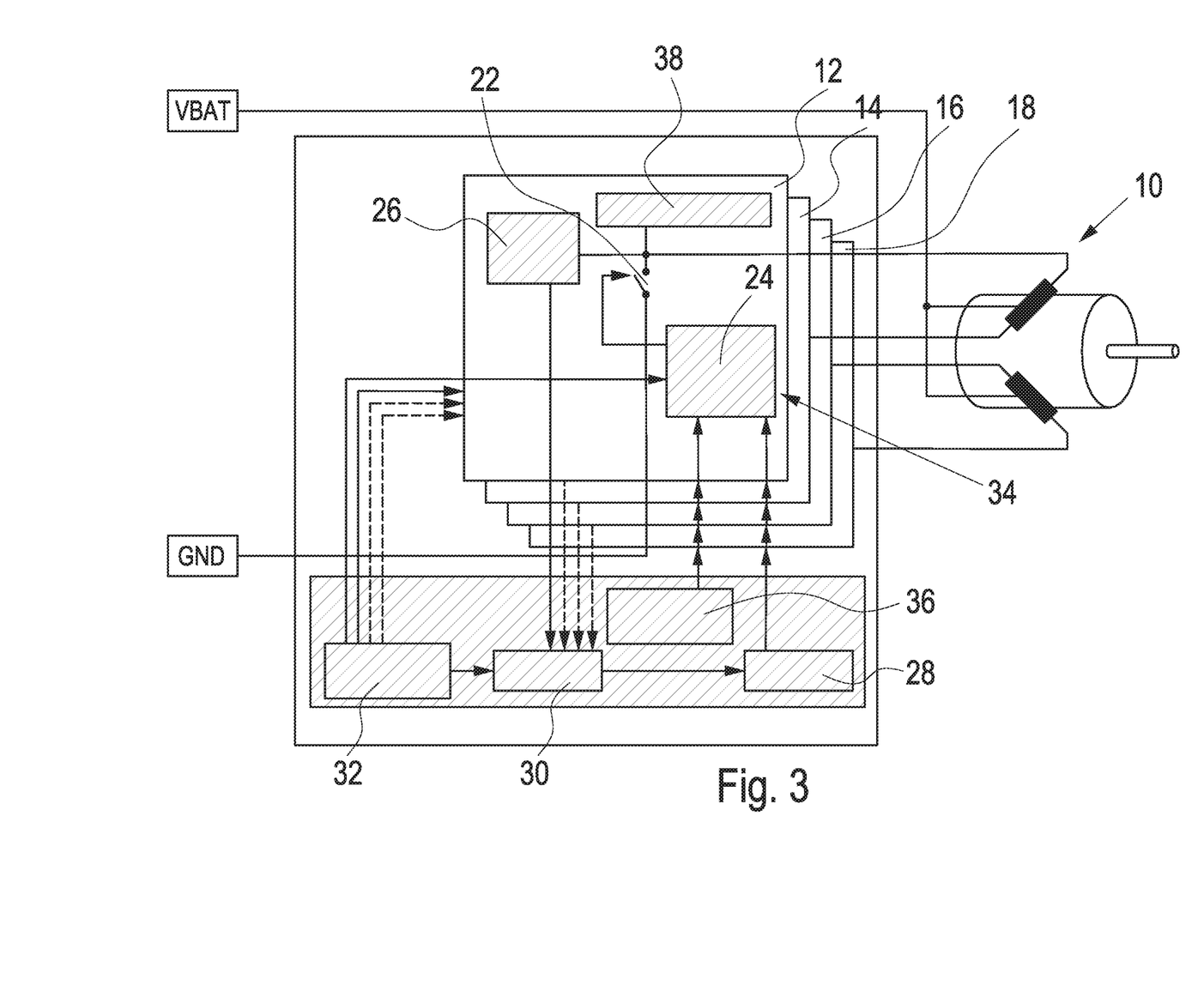

FIG. 3 shows the application of the disclosure to a unipolar stepper motor. As far as the elements of the circuitry of the unipolar stepper motor shown in FIG. 3 are identical or functionally analogous to those components that are illustrated in FIG. 1, they are accorded the same reference numerals in FIG. 3 as in FIG. 1.

In addition to the components of the individual output stages 12, 14, 26, 18 which are connected to the winding terminals A0, A1, B1, B0, these output stages each comprise a clamping circuit 35 in the example shown in FIG. 3. Instead, the high-side driver is omitted.

It also applies to FIG. 3 that the signal paths shown in broken lines are required if the method is also used with an inverse association of windings with respect to the test pulses and the blocking current. If the method is applied to all windings, the finest resolution for the control of the maintenance of the blocking position is achieved.

Figure 4:
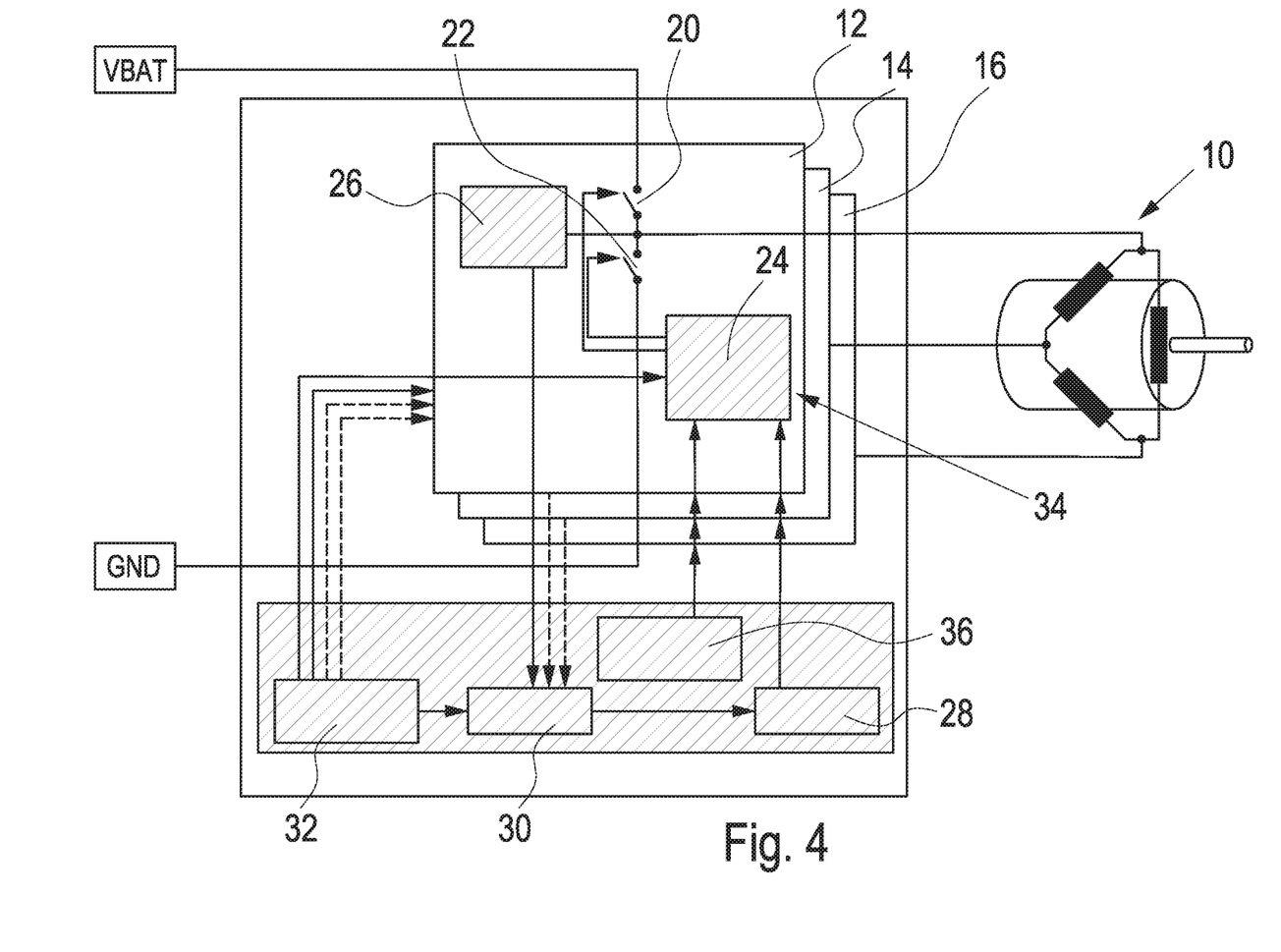

FIG. 4 shows a last example of the application of the disclosure in an electrically commutated electric motor without commutation sensors, the motor being configured in this case as a three-phase stepper motor. As far as the elements of the circuitry of the unipolar stepper motor shown in FIG. 4 are identical or functionally analogous to those components that are illustrated in FIG. 1, they are accorded the same reference numerals in FIG. 4 as in FIG. 1. In FIG. 4 as well, some signal paths are shown in broken lines which means that these signal paths are required if the method is also used with an inverse association of windings with respect to the test pulses and the blocking current. If the method is applied to all windings, the finest resolution for the control of the maintenance of the blocking position is achieved.

Three examples have been described with reference to FIGS. 1 to 4, wherein the modules involved in the adaptive supply if blocking current as provided by the disclosure are each identified by hatching. Depending on the desired system performance, it may be sufficient to limit the evaluation to one or a plurality of driver output stages. If the method is applied to all windings and, thus, all output stages are used, the finest resolution for the maintenance of the blocking position possible according to the disclosure is achieved.

LIST OF REFERENCE NUMERALS

10 stepper motor
12 driver output stage
14 driver output stage
16 driver output stage
18 driver output stage
20 high-side driver
22 low-side driver
24 control unit
26 discharge current detector
28 controller
30 counter
32 test current generation unit
34 blocking current generation unit
36 control unit
38 clamping circuit
A winding
B winding
A0 winding terminal
A1 winding terminal
B0 winding terminal
B1 winding terminal
S12 winding
S23 winding
S31 winding
P1 winding terminal
P2 winding terminal
P3 winding terminal

The invention claimed is:

1. A method for generating a blocking moment in a standstill state of an electrically commutated electric motor having at least two windings, wherein, on the electric motor a varying load moment acts from outside in the standstill state, the method comprising,
    a) supplying a blocking current with a predetermined maximum value into a winding terminal of a first winding,
    b) determining a motor inductivity parameter which represents an inductivity of the electric motor when the blocking current with the predetermined maximum value is supplied thereto in the standstill state, wherein a value of the motor inductivity parameter when the blocking current with the predetermined maximum value is supplied thereto forms an initial value,
    c) by successively reducing the blocking current down to, but not beyond a predetermined minimum value for the blocking current, to achieve a deviation of the value of the motor inductivity parameter from the initial value by more than a predetermined control deviation, d) stopping, in case the deviation of the value of the motor inductivity parameter from the initial value by more than the predetermined control deviation does not occur, the reduction of the blocking current upon reaching the predetermined minimum value for the blocking current, whereupon the value of the motor inductivity parameter is controlled to a value that does not deviate from the initial control value of the motor inductivity parameter given at a start of controlling the blocking current by more than the predetermined control deviation, e) controlling, in case that in step c) the deviation of the value of the motor inductivity parameter by more than the predetermined control deviation occurs, the value of the motor inductivity parameter to the value that does not deviate from the initial control value of the motor inductivity parameter given at the start of controlling the blocking current by more than the predetermined control deviation, and f) compensating by the control, a change of the motor inductivity parameter by a value greater than the control deviation, caused by a change of the load moment, the blocking current, whereby, the blocking current, is selected such that the blocking current is not smaller than the predetermined minimum value and further such that the blocking current is not greater than the predetermined maximum value.

2. The method of claim 1, further comprising:

a) generating a test current pulse adapted to be supplied into a winding other than the first winding during a standstill of the motor;

b) detecting as the motor inductivity parameter, a recirculation period resulting from the supply of the test current pulse, and c) using, as the motor inductivity parameter, the recirculation period within which a value of the test current, supplied as the test current pulse into the winding other than the first winding, has dropped to a predetermined minimum test current value.

3. The method of claim 2, further comprising controlling the electric motor by a driver circuit having driver output stages associated respectively with winding terminals of the electric motor, detecting a drop of the value of the test current supplied as the pulse by a discharge current detector associated with a winding terminal of the winding of the electric motor into which the test current is supplied as the pulse, and determining the recirculation period based on the output signal of the discharge current detector.

4. The method of claim 3, further comprising generating the output signal by the discharge current detector if the value of the test current has dropped to below the predetermined minimum test current value.

5. The method of claim 3, further comprising, in case the electric motor is configured as a unipolar stepper motor, implementing a clamping circuit for each driver output stage, and restricting the voltage by the clamping circuit at the winding terminal into which the test current has been supplied as the test current pulse to a preset value during the recirculation period, and determining, based on the discharge current detector signals an end of the voltage restriction, the recirculation period.

6. The method of claim 1, further comprising controlling the electric motor by a current chopper circuit including current chopper comparators, controlling the supply of the blocking current by current chopper controlling the terminal of the first winding, such that with a start of a clock interval of the current chopper control, the blocking current is supplied into the terminal of the first winding, the blocking current into the terminal of the first winding is increased up to a preset value and thereafter is reduced until an end of the clock interval, and using a chopper period from the start of the clock interval to a time within the clock interval at which the blocking current into the terminal of the first winding reaches the preset value as the motor inductivity parameter.

7. A device for generating a blocking moment in a standstill state of an electrically commutated electric motor having at least two windings, wherein, on the electric motor a varying load moment acts from outside in the standstill state, comprising:

a blocking current generation unit for supplying a blocking current into a terminal of a first winding of the electric motor, a motor inductivity detection unit for the detection of a motor inductivity parameter representing a value of a motor inductivity during the standstill state of the electric motor, a controller for controlling the blocking current during the standstill state of the electric motor for compensation of the varying load moment acting on the electric motor from the outside, the controller being supplied, as a control deviation, with a difference between a set value for the motor inductivity parameter as a reference variable and an actual value of the motor inductivity parameter as a feedback variable, the actual value of the motor inductivity parameter being a value that occurs due to a value of the blocking current supplied during the standstill state and a value of the load moment acting on the electric motor, and the controller outputting a signal to the blocking current generation unit as a control variable, and a control unit for controlling, during the standstill state of the electric motor, the blocking current generation unit to supply a maximum blocking current, controlling the motor inductivity detection unit to detect the motor inductivity parameter when the electric motor is supplied with the maximum blocking current, switching between a first operation mode in which the blocking current generation unit is controlled by the control unit, and a second operating mode in which the blocking current generation unit is controlled by the controller, controlling the blocking current generation unit to supply a blocking current which decreases successively starting from the maximum blocking current so as to cause a control deviation at the input of the controller which is greater than a predetermined threshold value, the control of the blocking current generation unit ending at latest when the blocking current has been reduced to a predetermined minimum current, and activating a function of the controller for switching the control of the blocking current generation unit from the control unit to the controller if, during the successive reduction of the blocking current, the control deviation exceeds the predetermined threshold value, to control the motor inductivity to the value of the motor inductivity parameter given upon activation of the function of the controller.

8. The device of claim 7, further comprising a test current generation unit for generating test pulses adapted to be supplied into a winding other than the first winding during the standstill state of the electric motor, wherein the motor inductivity detection unit detects, as the motor inductivity parameter, a recirculation period resulting from the supply of a test pulse.

9. The device of claim 8, further comprising a driver circuit having driver output stages associated with respective winding terminals of the electric motor and a discharge current detector associated with a terminal of the winding of the electric motor into which the test pulse is supplied, the recirculation period being determined based on the output signal of the discharge current detector.

10. The device of claim 9, wherein the discharge current detector generates the output signal when a value of a test current during the test pulse has dropped to below a predetermined minimum test current value.

11. The device of claim 9, wherein, if the electric motor is configured as a unipolar stepper motor, one clamping circuit is provided for each driver output stage to restrict a voltage to a preset value at the winding of the electric motor into which the test pulse is supplied, the discharge current detector outputting an output signal upon a decrease of the voltage to below the preset value.

12. The device of claim 7, wherein the blocking current generation unit has a current chopper circuit for current chopper control of the terminal of the first winding, wherein, the current chopper circuit, at a beginning of a clock interval of the current chopper control, supplies a current into the terminal of the first winding, such that the current increases up to a preset value and thereafter drops until an end of the clock interval, and a chopper period from the start of the clock interval to a time within the clock interval at which the current reaches the preset value, is the motor inductivity parameter representing the value of the motor inductivity.

\* \* \* \* \*